Jan. 22, 1957 R. E. LEWIS 2,778,709
RECORDER
Filed Oct. 26, 1953
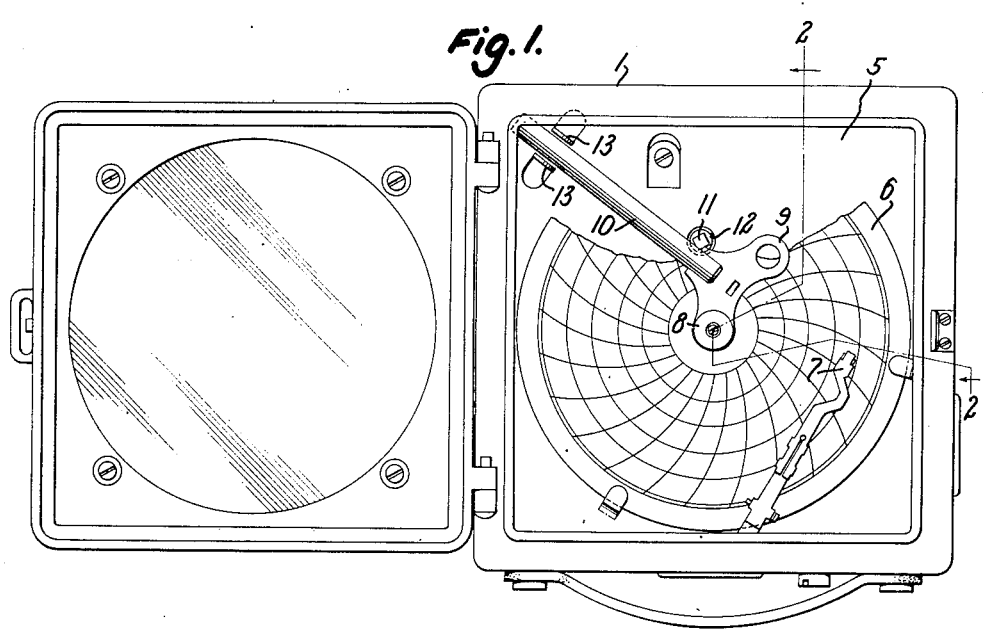
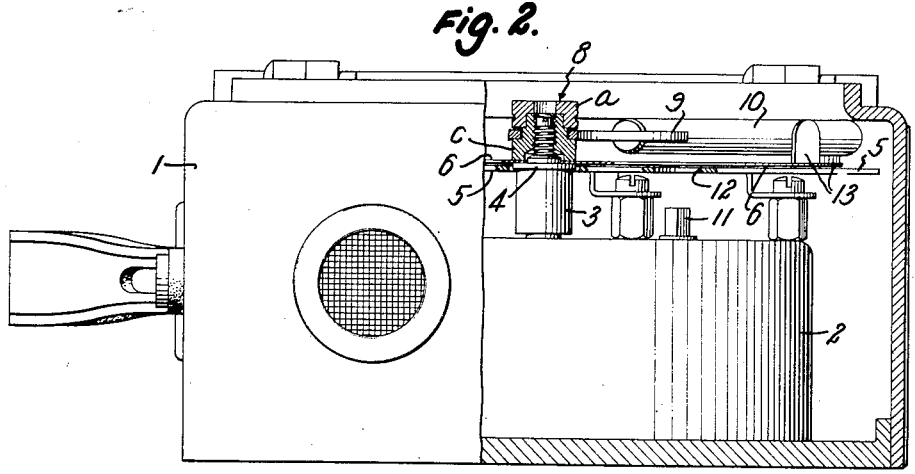
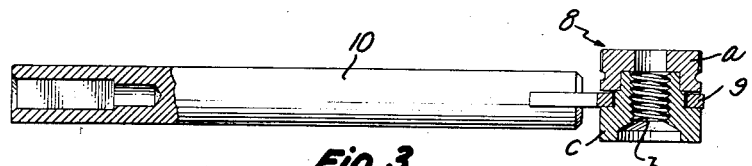
INVENTOR
Roger E. Lewis
BY Taylor, Capelli & Jerrick
ATTORNEYS

United States Patent Office 2,778,709
Patented Jan. 22, 1957

2,778,709
RECORDER

Roger E. Lewis, Elizabeth, N. J., assignor to Weston Electrical Instrument Corp., Newark, N. J., a corporation of New Jersey Application October 26, 1953, Serial No. 388,085

3 Claims. (Cl. 346—121)

This invention relates to recorders of the circular chart type and more particularly to a recorder in which the chart is driven by a mechanical clockwork mechanism which must be wound at periodic intervals, for example each day or so.

Such recorders include a hub nut for clamping a circular chart to the rotating shaft and it has been customary to attach the nut to the recorder case by means of a chain to prevent a loss of the hub nut if it should be dropped during the changing of charts. The clock mechanism must be wound at each change of a chart and it has been customary to support the winding key in clips in the recorder case, or to attach it to a chain secured to the case.

It is frequently awkward or inconvenient to manipulate a hub nut or a winding key which is attached to a chain and objects of the present invention are to provide a more convenient arrangement for avoiding loss of the hub nut of a recorder and for insuring that the winding key for the clock mechanism will always be at hand when required. More specifically, an object of the invention is to provide a circular chart recorder of the type driven by a mechanical clockwork and in which the hub nut for clamping the chart to the rotating shaft is secured to the winding key, whereby these two small but essential elements of the recorder cooperate to prevent loss or misplacement of each other.

These and other objects and the advantages of the invention will be apparent from the following description when taken with the accompanying drawings in which:

Fig. 1 is a plan view of a portable recorder embodying the invention; as seen with the cover open and with part of the chart broken away;

Fig. 2 is a sectional elevation taken substantially on line 2—2 of Fig. 1; and

Fig. 3 is a fragmentary section, on an enlarged scale, through the hub nut and key.

In the drawing, the reference numeral 1 identifies the portable casing which houses a mechanical clockwork mechanism 2 for rotating the shaft 3 which has a chart-supporting hub 4 that extends slightly above the internal top wall 5 to carry a circular chart 6 which is engaged by the stylus or pen 7 of a measuring instrument, not shown, the latter responding to the particular quantity, for example temperature, which is to be recorded.

In accordance with the invention, the chart 6 is secured to the hub 4 by a hub nut 8 which is loosely journalled in one opening in the butterfly head 9 of the winding key 10 of the clockwork mechanism. As shown in Fig. 3, the nut 8 is initially formed in two sections, one section comprising a knurled head $a$ and the other section a threaded stem $b$ having an enlarged head $c$. The stem $b$ is of such diameter as to pass freely through an opening in the head of the winding key, and has an outer end of reduced diameter over which the knurled head may be force fitted to couple the hub nut and the winding key, the parts of the nut being proportioned that the nut is loosely journalled on the key when the parts are united.

This connection of the hub nut and the winding key does not result in any inconvenience in the use of the recorder since access to the winding stem 11, square or otherwise non-circular in section at its outer end, of the clockwork mechanism 2 can be had only after the chart 6 has been removed from shaft 3 to clear the winding key opening 12 in the wall 5. The winding key 10 has a socket in the end of its stem remote from its head 9 and adapted to non-rotatably receive the outer end portion of said stem 11, as is customary. It is preferably of such length that it extends beyond the outer edge of the chart 6 and into a corner of the casing 1 where it will be held from rotation by the casing wall itself or, as illustrated, by clips 13 which are pressed up from the top wall 5 of the recorder.

It will be apparent that the winding key and chart hub form an integral unit which must be positioned in the housing, as shown clearly in Figure 1, when the chart is secured in the operating position, thereby eliminating the possiblity of misplacing the winding key. When the chart is to be replaced the chart hub nut 8 is unscrewed from the hub 4 thereby also permitting removal of the winding key from the housing. In general, the speed of rotation of the chart is one revolution per 24 hours, and it is customary to wind the spring of the clock motor once each day, the square-ended spring shaft being available from the front of the instrument when the chart is removed. Consequently, upon removal of the chart the winding key and the shaft of the motor spring are conveniently available to re-wind the clock motor.

Having now described my invention in detail in accordance with the patent statutes what I desire to protect by Letters Patent of the United States is recited in the following claims.

I claim:

1. An improved arrangement for removably securing to a recorder of the class comprising a housing, a mechanical clock mechanism for rotating a shaft having a threaded end adjacent a hub and a winding stem for said mechanism having an end portion noncircular in section, and a hub nut for threading upon said shaft to clamp a circular chart to said hub, a stem-including winding key with a socket for non-rotatably receiving the end portion of said stem, said improved arrangement comprising a clip secured in fixed position at a point spaced from the edge of the chart and adapted to receive the stem of the winding key, and means rotatably securing the hub nut to the winding key, the arrangement being such that the stem of the winding key is receivable by the clip when the hub nut is threaded upon said shaft.

2. An improved arrangement for removably securing the stem-including winding key to a recorder of the class comprising a housing, a mechanical clock mechanism for rotating a shaft having a threaded end above a hub, and a hub nut for threading upon said shaft to clamp a circular chart to the hub, said improved arrangement comprising a perforated, butterfly handle on one end of the winding key, means loosely journaling the hub nut in a perforation of said handle, and a clip secured in fixed position at a point spaced radially from the edge of the chart and adapted to receive the stem of the winding key when the hub nut is threaded upon said shaft.

3. The invention as recited in claim 1, wherein the means journaling the hub nut in a perforation of the winding key handle comprises a reduced diameter shank on the hub nut said shank passing loosely through the perforation, and an enlarged diameter bushing force-fitted over the said shank.

References Cited in the file of this patent
UNITED STATES PATENTS

| 1,078,867 | McGraw | Nov. 18, 1913 |
| 1,100,417 | Capitain | June 16, 1914 |
| 1,407,816 | Healy | Feb. 28, 1922 |
| 1,840,830 | Bristol | Jan. 12, 1932 |